March 28, 1961 L. C. PIETSCH 2,976,702
ROLLING MILL POWER TRANSMISSION LOCKING ARRANGEMENT
Filed March 18, 1959 2 Sheets-Sheet 1
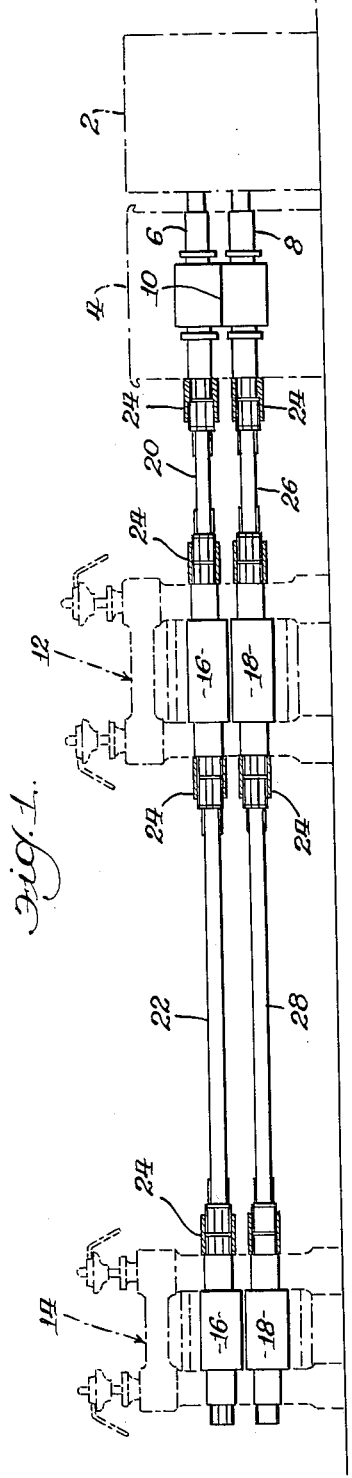
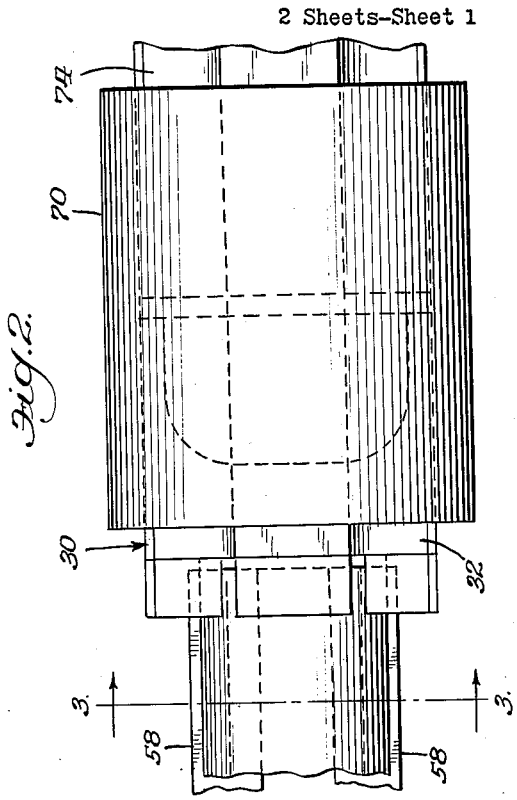
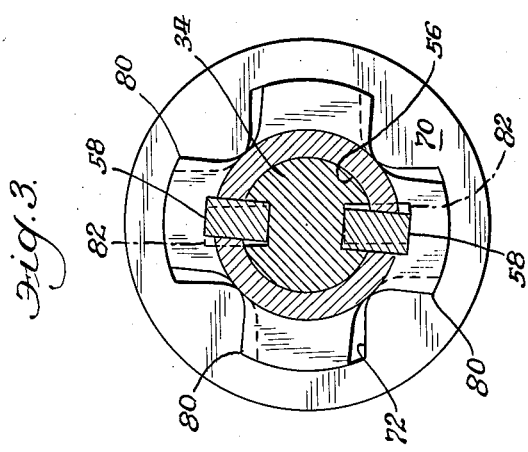
INVENTOR.
Leonard C. Pietsch

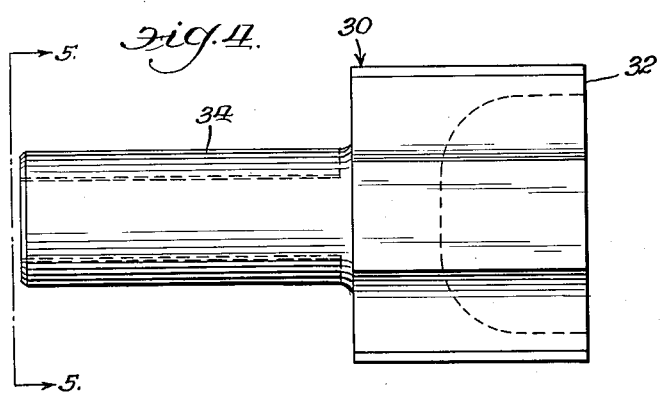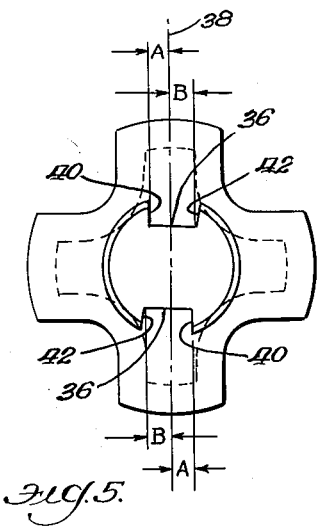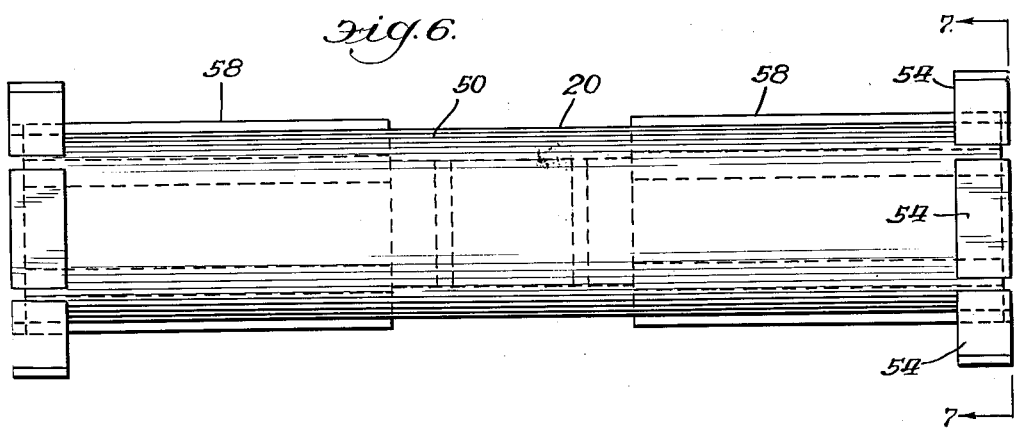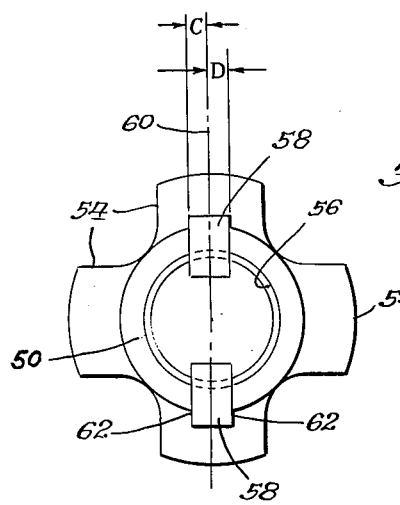
INVENTOR.
Leonard C. Pietsch

United States Patent Office 2,976,702
Patented Mar. 28, 1961

2,976,702

ROLLING MILL POWER TRANSMISSION LOCKING ARRANGEMENT

Leonard C. Pietsch, Joliet, Ill., assignor to Union Tank Car Company, Chicago, Ill., a corporation of New Jersey Filed Mar. 18, 1959, Ser. No. 800,227

8 Claims. (Cl. 64—1)

The invention relates to steel mills—for example, finishing roller mills—and particularly to the power transmission arrangement thereof and manner of locking same in place during power transmission.

Those skilled in the art of rolling mill construction and operation will understand that the various mill stages are frequently arranged in parallel or alternate-parallel, whereby two or more mills receive their power for operation from a single power source such as a motor drive, via appropriate interconnecting power transmission means or shafts. To assure smooth and efficient mill operation, the power transmission means employed must be of such design as to be positive and trouble-free. In addition, it is frequently necessary, due to a change of run type, to disassemble the mills and the power transmission means in order to change the rolls therein. In the past, these two desirable ends have produced an undesirable result in that the positive transmission means employed was of such complicated design in an effort to assure trouble-free operation, that considerable time was spent in dismantling such means to accommodate roller and mill set-up. Milldown time and production loss incidental thereto resulting from the operating difficulties associated with prior art power transmission arrangements has long been a source of difficulty in steel mill operation.

Accordingly, it is a primary object of the invention to provide a power transmission arrangement offering positive, trouble-free operation and accommodating simple and efficient assembly and disassembly.

It is a further object of the invention to provide coupling arrangements in power transmission systems of the type under consideration, of such a design that they positively lock under the action of power transmission and yet may be disassembled when idle by merely inducing minor relative shaft rotation and linear movement of a coupling box.

These and other objects of the invention will become apparent in the course of the following description, and from an examination of the associated drawings, wherein:

Figure 1 is a typical partially schematic mill transmission arrangement,

Figure 2 is a fragmentary detailed view of the coupling arrangement employed,

Figure 3 is a detailed view taken along lines 3—3 of Figure 2,

Figure 4 is a detailed view of a spindle end employed in the arrangement,

Figure 5 is a view taken approximately along line 5—5 of Figure 4,

Figure 6 is a detailed view of a spindle shaft employed in the arrangement disclosed, and Figure 7 is a view taken along lines 7—7 of Figure 6.

Describing the invention in detail, attention is first directed to Figure 1 which illustrates a typical finishing mill lay-out in partially schematic manner. A power source is indicated in phantom in Figure 2, said power source may be a typical motor drive or any other arrangement familiar to those skilled in the art. The numeral 4 designates the pinion section which houses and rotatably supports the power shafts 6 and 8, respectively. The shafts 6 and 8 are geared together as at 10 in the pinion section, whereby both the shafts 6 and 8 rotate at the same rate of speed. A first mill is indicated generally at 12, while a second mill is indicated generally at 14. In addition to other conventional structure, each mill comprises a pair of vertically arranged rollers 16 and 18 which rollingly receive and form the product being manufactured. To accommodate power transmission from the shaft 6 to the rollers 16, 16, first and second transmission shafts 20 and 22 are provided. As indicated above, transmission shaft disassembly is frequently required, and accordingly the shafts 20 and 22 must be independent power transmission shafts. To accommodate the power hook-up therefor, coupling arrangements 24, 24 are provided.

Turning to the main shaft 8, it is likewise necessary to provide independent shafts 26 and 28 to transmit power to the rollers 18, 18. Again, coupling arrangements 24, 24 are provided. The particular invention herein disclosed relates to the structural make-up of the power transmission shafts 20 and 22 and 26 and 28 and coupling arrangements 24 employed therewith.

To better understand the invention, attention is first directed to the detailed views illustrated in Figures 4 through 7, inclusive. Figures 4 and 5 indicate a spindle end which is in itself a separable part in the coupling arrangement 24. For purposes of identification, the spindle end is indicated generally with the numeral 30. The spindle end 30 comprises a body portion 32 of cruciform configuration, when viewed in end elevational view as seen in Figure 5. A circular shaft 34 axially projects from one side of the body portion 32 and has opposed keyways 36, 36 milled therein. It will be particularly noted that each keyway 36 is not uniformly distributed about the vertical center line indicated at 38. That is, the distance indicated by the letter B is greater than the distance indicated by the letter A, and one wall 40 of each keyway is parallel to the vertical axis 38, while the other wall 42 of the keyway is in acute angular relationship to the vertical center line 38. The keyways are, of course, identical in form. For purposes of this disclosure, therefore, a keyway having the form just described will be referred to as "an offset keyway."

Attention is now directed to Figures 6 and 7 which illustrate in detail the typical shafts 20, 22, 26 or 28 employed in the structure shown in Figure 1. It will be understood that all of such shafts are of identical form, and for purposes of simplicity the shaft illustrated in Figures 6 and 7 will be identified by the numeral 20. The shaft 20 here comprises a main tubing 50, and each end of the shaft further is provided with projecting bosses 54, 54 which are machined or formed to a cruciform configuration of complemental form to that of the body portion 32 of the spindle end 30. The tube 50 is provided with a hollow circular aperture 56 at opposed ends thereof, said aperture being of such size that it will complementally receive the circular shaft 34 of the spindle end 30. Opposed keys are fixedly mounted in opposite ends of the spindle shaft to project into the circular aperture 56. It will be particularly noted that the keys 58, 58 are uniformly distributed about the vertical center line 60 of the spindle shaft—that is, the distances C and D as illustrated in Figure 7 are equal. Furthermore, opposed surfaces 62, 62 of each key 58 are parallel to said vertical center line 60. For purposes of this disclosure, a key of the type described immediately above will be referred to as "a uniform key."

Attention is now directed to Figures 2 and 3 which illustrate the assembled coupling arrangement. It will first be noted that a coupling box 70 is provided, having an outer circular configuration and a central aperture of cruciform configuration indicated by the numeral 72 accommodating reception of the similarly formed parts 32 of the spindle end 30 and a cruciform section end portion 74 of the pinion shaft 6. The circular shaft 34 of the spindle end 30 is received in aperture 56 of the spindle shaft 20, thus completing the operative power train. It will thus be apparent to those skilled in the art that a driving connection is provided—first between the pinion end portions 74 and the coupling box 70, then between the coupling box 70 and the cruciform portion 32 of the spindle end 30, and lastly between the circular shaft 34 through keys 58 to the spindle shaft 20. It will further be noted that the arrangement illustrated in Figures 2 and 3 has been designed for a driving connection in a counter-clockwise direction, as viewed in Figure 3. Thus, the cruciform portions of the pinion 6 at 74, the cruciform aperture 72 of coupling box 70, and the cruciform portion 32 of the spindle end 30 become angularly offset from the cruciform portions 54 of the shaft 20. This is illustrated at 80 in Figure 3. Thus, those portions 80 of the shaft 20 provide abutments which prevent the coupling box 70 from moving axially on the spindle end 30 and pinion shaft 6 during power transmission. In this manner, positive power transmission is assured.

To disassemble the shafts, the mill is merely brought to an idle condition and the shaft 20 is independently rotated in a clockwise direction until the key 58 takes up the position indicated in phantom at 82 in Figure 3. At this point, the various cruciform portions mentioned are all in registry and the coupling box 70 may be slid axially onto the shaft 20, breaking the driving connection between the pinion shaft 6 and the spindle end 30. In view of the fact that all of the coupling arrangements 24 are employed of similar structure, it is apparent that the entire mill power transmission arrangement can be disassembled and assembled quickly and easily.

With the above in mind, it is apparent that the particular structural combination of series-arranged driving connections employing at some point in said series an offset keyway coupled with a uniform key, offers a "limited angular lost motion key connection" which assures positive drive during power transmission, preventing accidental disassembly and easy assembly and disassembly during mill-down time. While the coupling arrangement illustrated employed throughout cruciform sections to obtain positive driving connection, it will be apparent that the limited angular lost motion driving connection could be utilized with other geometric forms and still achieving the desirable results obtained.

The invention as shown is by way of illustration and not limitation, and may be subject to various modifications without departing from the spirit thereof or the scope of the appended claims.

What is claimed is:

1. In a power transmission arrangement, a first driving shaft element, a second driven shaft element, means providing a power transmission connection between the elements comprising a first member having a positive driving connection to one of said elements, a second member, a positive driving connection between said members, a lost motion driving connection between said second member and the other of said elements accommodating a limited relative movement therebetween, and abutments on said other element and said first member movable from a neutral position into an interfering position in response to said limited relative movement between the second member and said other element.

2. A power transmission arrangement according to claim 1, wherein all of said driving connections are key-and-slot connections.

3. A power transmission arrangement according to claim 2, wherein said lost motion driving connection comprises an offset keyway receiving a uniform key.

4. A power transmission arrangement according to claim 3, wherein said first mentioned positive driving connection and said second mentioned positive driving connection comprise a cruciform aperture in said first member telescopically receiving registering cruciform sections of said one element and said second member whereby said first member may be moved axially over said one element and said second member.

5. A power transmission arrangement according to claim 4, wherein the other of said elements is provided with a cruciform section adjacent said first member accommodating axial movement between said first member and said other element when said lost motion driving connection is in neutral position.

6. In a power transmission arrangement, a driving shaft means, a driven shaft means, a first coupling member in rotatable driving engagement with said driving shaft means, a second coupling member in rotatable driving engagement with said driven shaft means, said first and second coupling members being in rotatable driving engagement to effect a driving connection between said driving and driven shaft means, and means including a portion of said first and second coupling members for preventing relative axial movement of said coupling members when in a first relative position and for permitting relative axial movement of said coupling members when in a second relative position in order to break a driving connection between said driving shaft means and driven shaft means.

7. The power transmission arrangement of claim 6 wherein said last mentioned means includes a first abutment means provided in said first coupling member and a second abutment means provided in said second coupling member, said first and second abutment means when in said first position being axially aligned with one another to prevent relative axial movement of said coupling members and when in said second position being axially unaligned with one another to permit relative axial movement of said coupling members.

8. The power arrangement of claim 6 where there is additionally provided interlocking means between said driven shaft means and said second coupling element, said interlocking means providing a lost motion connection to permit said first and second coupling members to assume first and second relative positions.

References Cited in the file of this patent

UNITED STATES PATENTS

| | | |
|---|---|---|
| 1,636,262 | Troendly | July 19, 1927 |
| 2,375,030 | O'Malley | May 1, 1945 |
| 2,386,630 | O'Malley | Oct. 9, 1945 |
| 2,525,695 | Lombard | Oct. 10, 1950 |
| 2,909,045 | Burns | Mar. 18, 1959 |